(No Model.) 2 Sheets—Sheet 1.

D. PATTERSON.
ATTACHMENT TO HARVESTERS.

No. 261,951. Patented Aug. 1, 1882.

Attest:
A. Barthel
Charles J. Hunt

Inventor:
David Patterson
per Thos. S. Sprague
Att'y

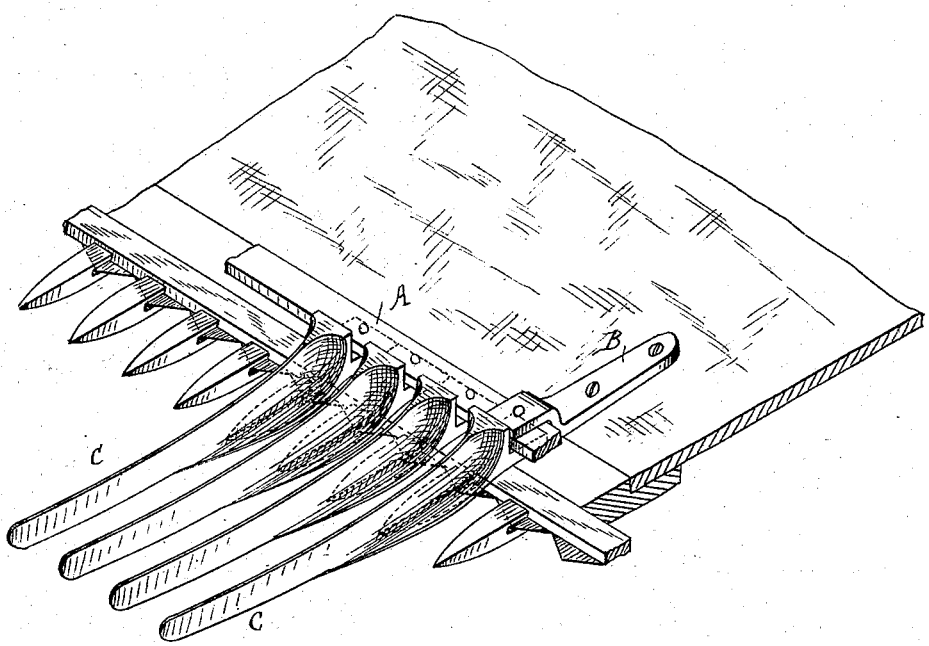

UNITED STATES PATENT OFFICE.

DAVID PATTERSON, OF CHATHAM, ONTARIO, CANADA.

ATTACHMENT TO HARVESTERS.

SPECIFICATION forming part of Letters Patent No. 261,951, dated August 1, 1882.

Application filed March 4, 1882. (No model.)

*To all whom it may concern:*

Be it known that I, DAVID PATTERSON, of Chatham, in the county of Kent and Province of Ontario, Canada, have invented new and useful Improvements in Bean-Cutter Attachments for Harvesters; and I hereby declare that the following is a full, clear, and exact description thereof, reference being had to the accompanying drawings, which form a part of this specification.

The nature of this invention relates to certain new and useful improvements in the construction of a finger-bar attachment to harvesters, whereby such machines are rendered capable of successfully harvesting beans.

The invention consists in the peculiar construction of a supplemental finger-bar and fingers designed to be attached to the platform of the harvester above the fingers or guards and the reciprocating cutter, all as more fully hereinafter set forth.

Figure 1:
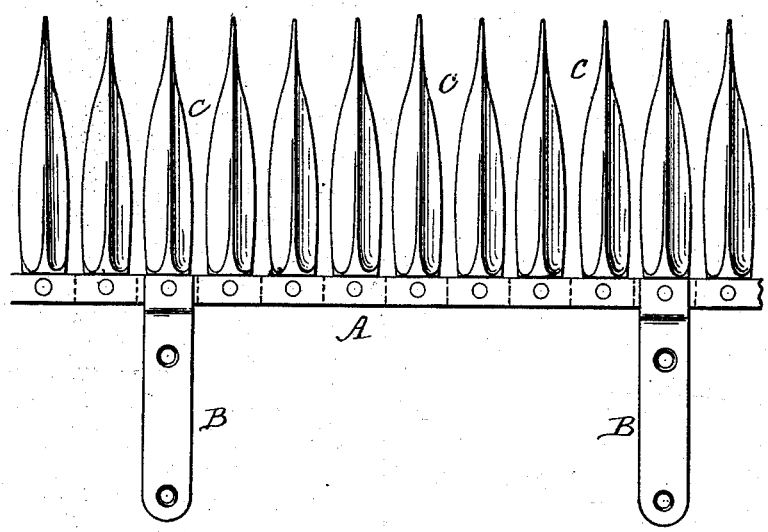
Figure 2:
Figure 3:

Figure 1 is a plan view, showing my finger-bar or gatherer. Fig. 2 is a side elevation of one finger. Fig. 3 is a cross-section of the same. Fig. 4 is a perspective view, representing my device attached to a harvester-platform.

In the accompanying drawings, A represents a finger-bar, provided with the rear projecting arms, B, by means of which the same may be secured to the table of a harvester, above the reciprocating cutter and the finger-guard.

C represents a series of fingers, which are rigidly secured at their rear ends to the bar A. These fingers are convex upon their lower face from heel to toe, Fig. 2, and double concave in cross-section upon their upper face, and terminate in a vertically-flat toe at their outer or free ends. In practice, this finger-bar being secured to the harvester-platform, the fingers project in advance of the fingers or guards of the cutter and the platform is tipped so that the outer ends of the fingers C rest upon the ground. In the forward movement of the machine these fingers pick up or gather the bean-stalks and direct them to the cutters, while they prevent the pods from falling between the knives.

By the use of this supplemental finger-bar I am enabled to harvest my beans in good shape and free from roots and dirt.

What I claim as my invention is—

1. An attachment to harvesters, consisting of the supplemental finger-bar A, provided with fingers located above and projecting downward in front of the guard-fingers, each of said supplementary fingers having a convex lower face and provided with a longitudinal rib on its upper face, substantially as and for the purpose specified.

2. A supplemental finger-bar and fingers attached to harvesters, such fingers being double concave upon their upper face in cross-section and convex upon their lower face lengthwise of the finger, and terminating in a vertically-flat toe at their front ends, substantially as described.

DAVID PATTERSON.

Witnesses:
H. S. SPRAGUE,
CHARLES J. HUNT.